(12) United States Patent
Borsuk et al.

(10) Patent No.: US 8,907,564 B2
(45) Date of Patent: Dec. 9, 2014

(54) MICROWAVE EXCITED ULTRAVIOLET LAMP SYSTEM WITH DATA LOGGING AND RETRIEVAL CIRCUIT AND METHOD

(75) Inventors: James Borsuk, Westlake, OH (US); James Khoury, Strongsville, OH (US); Ed McGhee, Amherst, OH (US); James Smith, Amherst, OH (US)

(73) Assignee: Nordson Corporation, Westlake, OH (US)

( * ) Notice: Subject to any disclaimer, the term of this patent is extended or adjusted under 35 U.S.C. 154(b) by 520 days.

(21) Appl. No.: 13/343,196

(22) Filed: Jan. 4, 2012

(65) Prior Publication Data
US 2013/0169151 A1    Jul. 4, 2013

(51) Int. Cl.
H01J 25/50    (2006.01)

(52) U.S. Cl.
USPC ............................................. 315/39.51

(58) Field of Classification Search
CPC ....... H05J 25/587; H01J 65/044; H01J 23/05; H01J 23/40; H05B 37/02; Y02B 20/45
USPC ..................... 315/39.51, 39.53, 149
See application file for complete search history.

(56) References Cited

U.S. PATENT DOCUMENTS

| | | | |
|---|---|---|---|
| 6,265,830 B1 * | 7/2001 | Bretmersky et al. | 315/106 |
| 6,622,178 B1 | 9/2003 | Burke et al. | |
| 6,823,202 B2 | 11/2004 | Hause, Jr. | |
| 6,894,299 B2 | 5/2005 | Harrell et al. | |
| 6,952,082 B2 | 10/2005 | Schmitkons et al. | |
| 7,233,645 B2 | 6/2007 | Feda | |
| 7,952,289 B2 * | 5/2011 | Bretmersky et al. | 315/39.51 |
| 2007/0295012 A1 | 12/2007 | Ho et al. | |
| 2010/0299560 A1 | 11/2010 | Lin | |

FOREIGN PATENT DOCUMENTS

DE    112011102339 T5    4/2013

OTHER PUBLICATIONS

European Patent Office, Examination Report in German Application No. DE102013200049.9, Jan. 30, 2014.

* cited by examiner

Primary Examiner — Minh D A
(74) Attorney, Agent, or Firm — Wood, Herron & Evans, L.L.P.

(57) ABSTRACT

A microwave excited ultraviolet lamp system with a data logging and retrieval circuit and method for operating the same. The data logging and retrieval circuit stores operational data in a cache memory using a FIFO data storage protocol. The contents of the cache memory are periodically copied to a larger removable memory so that the removable memory contains a relatively long historical record of the system operational parameters. The data logging and retrieval circuit includes a data port configured to load the contents of the cache memory into an external device when the device is coupled to the data port. A second data port allows the external device to supply power to the data logging and retrieval circuit so that data may be retrieved when the internal power supply is malfunctioning. Data stored in the removable memory may be protected so that it may only be accessed by authorized personnel.

22 Claims, 3 Drawing Sheets

MICROWAVE EXCITED ULTRAVIOLET LAMP SYSTEM WITH DATA LOGGING AND RETRIEVAL CIRCUIT AND METHOD

FIELD OF THE INVENTION

The present invention relates generally to a microwave excited ultraviolet lamp system with a data logging and retrieval circuit, and to methods for maintaining and retrieving operational data from a microwave excited ultraviolet lamp system.

BACKGROUND OF THE INVENTION

Microwave excited ultraviolet ("UV") lamp systems are commonly used for heating and curing materials such as adhesives, sealants, inks, and coatings, as well as for modifying the surface of an object on a molecular level. Microwave excited ultraviolet lamp systems produce ultraviolet light by exciting an electrodeless plasma lamp with microwave energy. The electrodeless lamp is mounted within a metallic microwave cavity or chamber, and one or more microwave generators, such as magnetrons, are coupled to the interior of the microwave cavity. The magnetrons supply microwave energy to initiate and sustain a plasma in a gas mixture that typically includes mercury and that is enclosed in the electrodeless lamp. In turn, the plasma emits a characteristic spectrum of electromagnetic radiation strongly weighted with spectral lines or photons having ultraviolet and infrared wavelengths.

Microwave-excited ultraviolet light lamp systems typically have one or more power supplies that provide high voltage to each magnetron, as well as lesser voltages to other lamp system components, system control electronics, sensors, and magnetron filaments. The system operational data is used by the power supply to adjust supplied voltages and currents, and may also be monitored by system technicians to assist with system set up and troubleshooting, as well as for diagnosing causes of malfunctioning equipment. However, this type of troubleshooting requires that a technician be on site to monitor the operational data. On site visits to repair, maintain and trouble shoot microwave excited ultraviolet lamp systems may result in significant costs associated with lost productivity during travel time to the site, as well as other travel related expenses. Further, certain types of system failures may cause the operational data to be unavailable for analysis, making diagnosis of the problem more difficult.

Thus, there is a need for microwave excited ultraviolet lamp systems with data logging and retrieval circuits, as well as methods that can provide operational data after system failures and that can be provided to technicians without requiring a site visit.

SUMMARY OF THE INVENTION

The present invention overcomes the foregoing and other shortcomings and drawbacks of known microwave excited ultraviolet lamp systems and methods for monitoring system operational data. While the invention will be described in connection with certain embodiments, it will be understood that the invention is not limited to these embodiments. On the contrary, the invention includes all alternatives, modifications and equivalents as may be included within the spirit and scope of the present invention.

According to one embodiment of the present invention, a microwave excited ultraviolet lamp system with a data logging and retrieval circuit is provided which includes a memory and a data port. The data logging and retrieval circuit is configured to store operational data from the microwave excited ultraviolet lamp system to the memory on a periodic basis while the microwave excited ultraviolet lamp system is in operation. When an external device is interfaced with the data port, the operational data contained in the memory is transferred to the external device.

In other embodiments, the external device may provide power to the data logging and retrieval circuit, so that stored operational data may be retrieved from the memory when an internal power supply that normally supplies power to the data logging and retrieval circuit has failed or is otherwise unable to power up the circuit.

In yet another embodiment, the data logging and retrieval circuit includes a removable memory for storing operational data from the microwave excited ultraviolet lamp system. The removable memory may be a second memory that is physically separate from a first memory. In embodiments including two memories, data may be read from the first memory and written to the second memory. Operational data may thereby be retrieved from the data logging and retrieval circuit by removing the removable memory and interfacing the removable memory with an external device.

The ability to access operational data during the time leading up to a system failure facilitates diagnosing system problems as well as improving the ability to assess system performance. Further, the operational data can be made available to technicians off site, thereby allowing technicians to avoid unnecessary site visits. Operational data may also be collected over a period of time sufficient to observe operational trends, thereby facilitating development of improved maintenance schedules and more accurate predictions of component lifetimes.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE INVENTION

A microwave excited ultraviolet lamp system according to one embodiment of the present invention includes a data logging and retrieval circuit having non-volatile memory and a data port. The circuit receives data representative of operational characteristics of the system, referred to as operational data, from the microwave excited ultraviolet lamp system. The operational data may include, for example, system fault codes. The circuit stores the operational data in memory on a first-in/first-out basis so that the memory contains a rolling time block of system operational data. The operational data stored in the memory of the data logging and retrieval circuit may include lamp head operational data and system power supply operational data. When an external device, such as a USB flash drive or other memory device is coupled to the data port, the data logging and retrieval circuit copies the contents of the memory to the external device. In cases where the system is malfunctioning so that the data logging and retrieval circuit cannot power up, power may be supplied to the data logging and retrieval circuit though the data port, such as by coupling a computer to a USB type-B port, allowing access to the operational data stored in memory.

Figure 1:
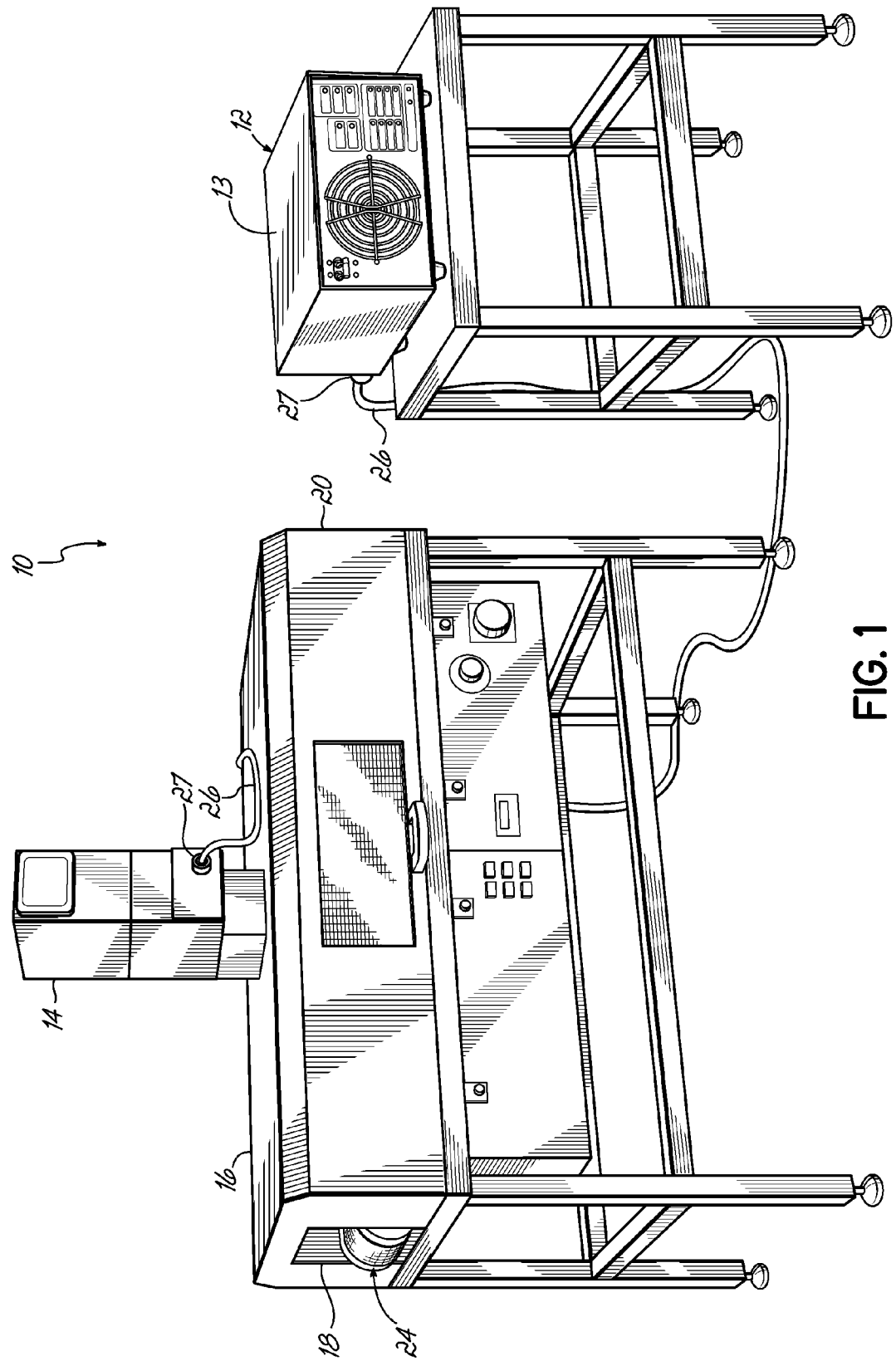
FIG. 1 is a perspective view of a microwave excited ultraviolet lamp system according to one exemplary embodiment, including a power supply and a lamp head.

Referring now to the figures, and to FIG. 1 in particular, a microwave excited ultraviolet lamp system 10 is illustrated including a power supply 12, a lamp head 14 and a chamber 16. The chamber 16 has an inlet 18, an outlet 20, and an interior space (not shown) between the inlet 18 and the outlet 20 where a product (not shown) may be exposed to ultraviolet light produced by the lamp head 14. An ultraviolet light permeable conveyor 24 may be mounted within the chamber 16 to move the product through the interior space from the inlet 18 to the outlet 20. Products exposed to ultraviolet light may include consumer products, intermediate manufacturing products, or any other type of product that requires treatment with ultraviolet light. The microwave excited ultraviolet lamp system 10 may thereby be used to cure ultraviolet light curable materials, such as inks or adhesives, or for any other treatments that rely on exposure ultraviolet light. One exemplary embodiment of an ultraviolet curing lamp system for use with the chamber 16 is further detailed in U.S. Pat. No. 6,894,299 and U.S. Publication Nos. 2004/0155591 and 2009/0160345, each owned by the common assignee and hereby incorporated by reference herein in their entireties, to which the reader is referred.

The lamp head 14 may be mounted to the top of chamber 16 and configured so that ultraviolet light is directed generally downward into the interior of the chamber 16, thereby irradiating the product as it moves along the conveyor 24. Although illustrated as mounted to the top of chamber 16, it is understood that other lamp head 14 mounting configurations, such as mounting to the bottom or sides of the chamber 16, may be used. The lamp head 14 is provided with power and control signals from the power supply 12, which is electrically coupled to lamp head by one or more multi-conductor cables 26. In this way, the power supply 12 controls the operation of the lamp head 14. Cable 26 provides a transmission path for power, lamp head operational data obtained from the lamp head 14 by the power supply 12, and other signals between the power supply 12 and the lamp head 14, and includes connectors 27 to facilitate set-up and tear down of the microwave excited ultraviolet lamp system 10. The power supply 12 includes a housing 13, and is connected to power lines (not shown), such as a 380 volt three phase AC power source, a 480 volt three phase AC power source, or any other suitable power source, so that the power supply 12 may provide the necessary operating voltages to the lamp head 14.

Figure 2:
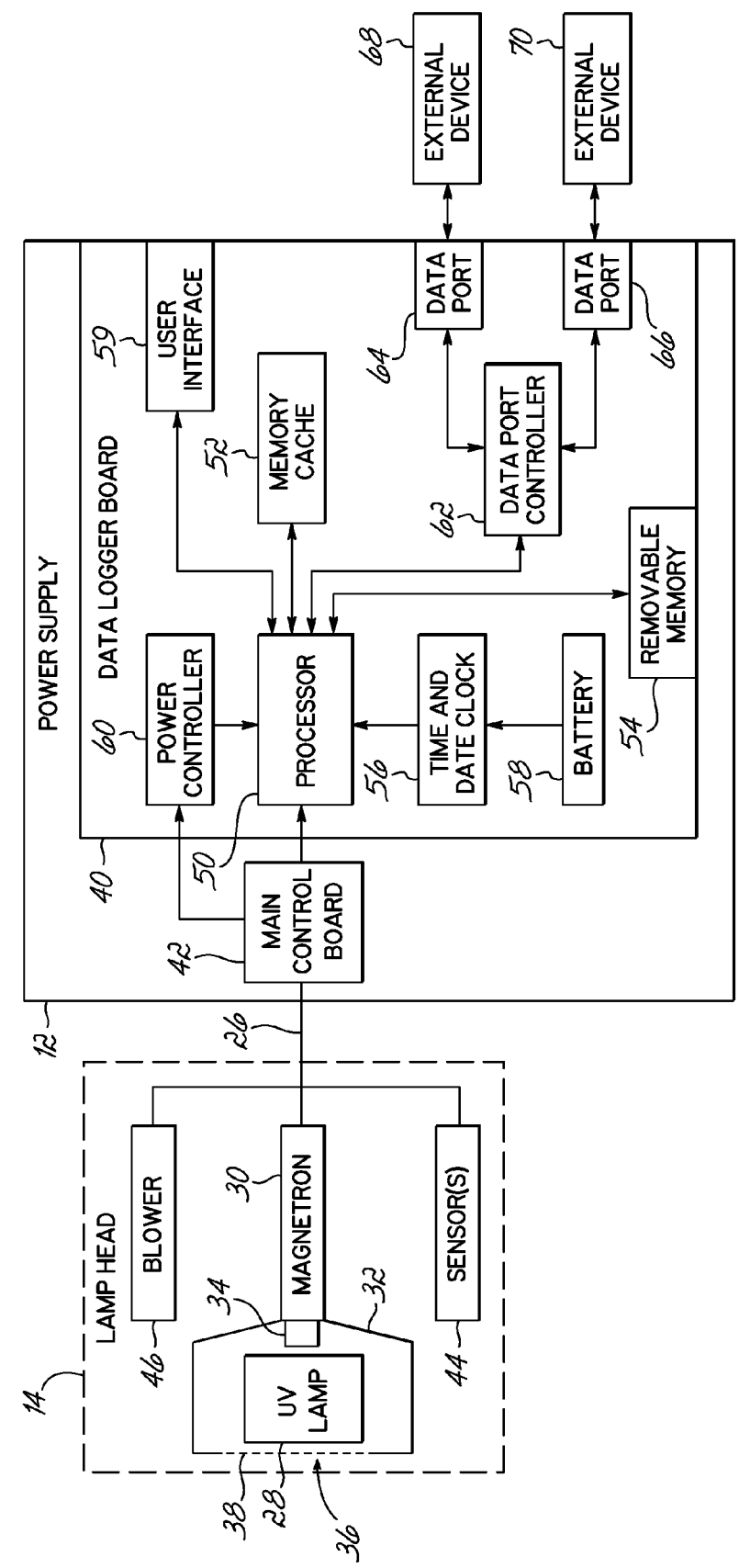
FIG. 2 is a schematic block diagram of the microwave excited ultraviolet lamp system illustrated in FIG. 1, including a schematic block diagram of the power supply in accordance with one embodiment of the present invention.
Figure 3:
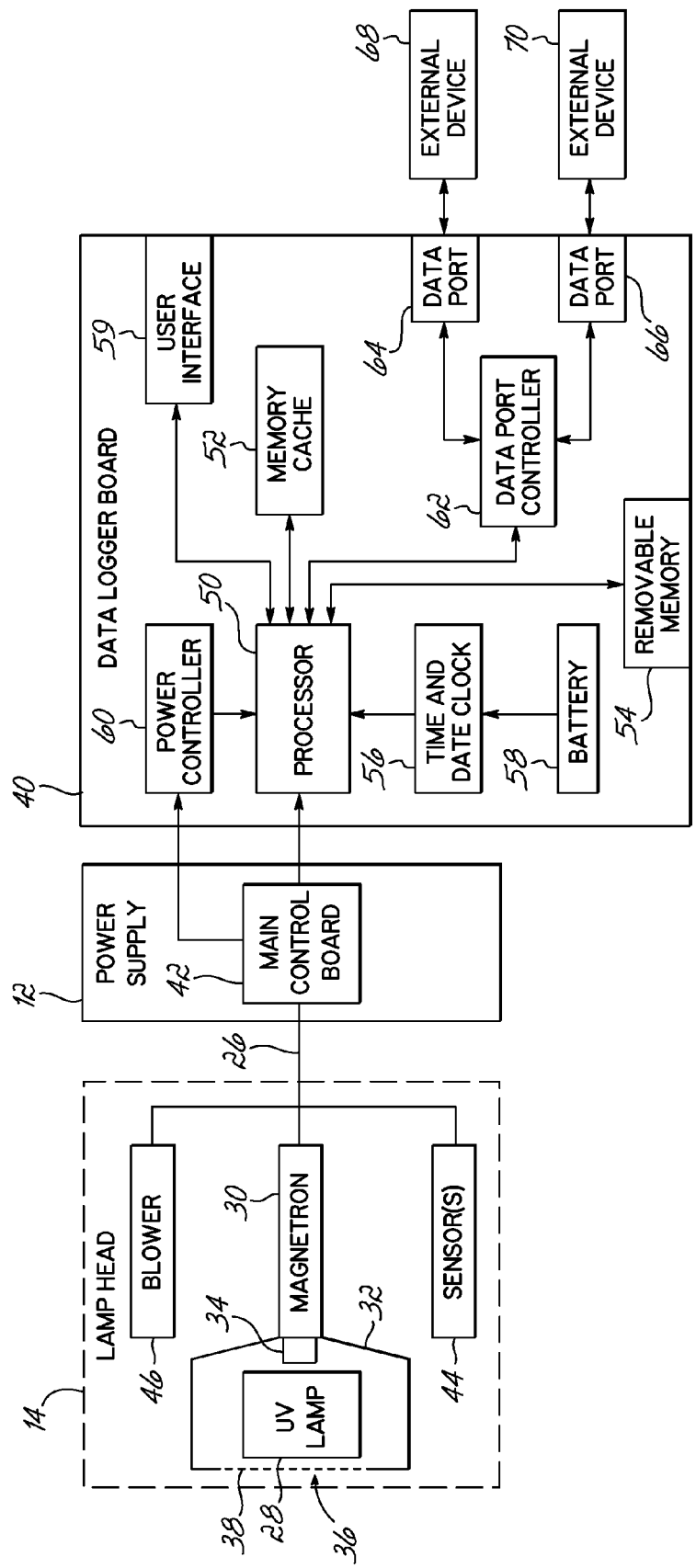
FIG. 3 is a schematic block diagram of a microwave excited ultraviolet lamp system according to an alternative embodiment of the present invention.

Referring now to FIGS. 2 and 3, and in accordance with embodiments of the invention, a block diagram is presented illustrating functional details of the ultraviolet lamp head 14 and power supply 12 with an integrated data logger board 40 (FIG. 2) and an external data logger board 40 (FIG. 3). The lamp head 14 includes an electrodeless UV lamp 28, which is excited into luminescence by microwave radiation supplied from one or more magnetrons 30. The UV lamp 28 is mounted within a microwave cavity 32 that is coupled to the magnetron 30 by a waveguide 34. When the magnetron 30 is energized, microwave energy is supplied to the cavity 32 through the waveguide 34, exciting gasses in the UV lamp 28 so that the gasses form an ultraviolet light emitting plasma. The microwave cavity 32 also includes one or more reflectors or other optical elements (not shown) to direct the ultraviolet light from the microwave cavity 32 through an outlet 36 and into the chamber 16. A metal screen 38 or similar device that is opaque to microwave radiation, but that transmits ultraviolet light, covers the outlet 36 to reduce the emission of microwave energy into the chamber 16, while allowing the ultraviolet light to reach the product.

In an embodiment of the microwave excited ultraviolet lamp system 10, the data logging and retrieval circuit is implemented on the data logger board 40. The data logger board 40 may be integrated with the power supply 12 as illustrated in FIG. 2, or physically separate from the power supply 12 as illustrated in FIG. 3. In embodiments having an integrated power supply 12 and data logging board 40, the data logging board is housed within the power supply housing 13. In embodiments having a non-integrated data logging board, the data logging board is external to the power supply housing 13 and/or remote from the power supply 12. Externally located data logging boards 40 are enclosed in a separate housing (not shown) and may be coupled to the power supply 12 with a cable (not shown) similar to cable 26 so that power and data signals may be exchanged between the data logging board 40 and the power supply 12. Externally located data logging boards 40 are powered by the power supply 12 through the cable, or include a separate power supply (not shown) so that power from the power supply 12 is not required. Although the data logging board 40 is shown in FIGS. 2 and 3 as obtaining system operational data through the power supply 12, the invention is not so limited. Persons having ordinary skill in the art will understand that the data logger board 40 could also be configured to obtain operational data via one or more direct connections with the lamp head 14.

The power supply 12 includes a main control board 42 configured to supply operating voltages to the components in the lamp head 14, such as the magnetron 30 and sensors 44. The power supply 12 also provides power to a blower 46 configured to direct a forced flow of air to cool the lamp head 14. The main control board 42 is further configured to receive signals from the sensors 44 so as to obtain data on operational conditions in the lamp head 14. Lamp head and power supply operational conditions monitored may include, but are not limited to, magnetron current and voltage (for each magnetron in the lamp head), filament voltage and current, main control board temperature, lamp head pressure, lamp head temperature, lamp head board temperature, rate of cooling air flow, static air pressure, radio frequency (RF) detection, and UV lamp light output level. The power supply 12 is electrically coupled to the lamp head 14 by cable 26, which has sufficient length so that the power supply 12 may be located remotely from the chamber 16. The power supply 12 and lamp head 14 may each incorporate an electrical connector (not shown) compatible with cable 26 for creating respective electrical connections between the main control board 42, the components inside the lamp head 14, and the electrical cable 26.

The data logger board 40 receives power and data from the main control board 42 and includes a processor 50 electrically coupled to a memory cache 52, a removable memory 54, a time keeping device or clock 56 having a battery back-up 58, a user interface 59, a power controller 60, and a data port controller 62. Data port controller 62 may be a universal serial bus (USB) controller and may be electrically coupled to one or more data ports 64, 66. In a specific embodiment of the invention, data port 64 is a USB type A data port, and data port 66 is a USB type B data port. In an alternative embodiment of the invention, the data ports 64, 66 and data port controller 62 may be omitted from the data logger board 40. In this alternative embodiment, operational data would be recovered by removing the removable memory 54 and interfacing the removable memory 54 with an external device, such as a computer with a memory card reader. In yet another alternative embodiment, the memory cache 53 could be omitted, or conversely be removable, in which case the removable memory 54 could be omitted.

Processor 50 may be a microcontroller, a microprocessor, or other computer or programmable logic device. Processor 50 is in communication with the main control board 42 through a data interface, such as a serial peripheral interface bus, so that the processor 50 obtains operational data associated with the microwave excited ultraviolet lamp system 10 from the main control board 42. The operational data includes data provided from the sensors 44 as well as other data generated by the power supply 12. Examples of operational data associated with operation of an microwave excited ultraviolet lamp system may include, but are not limited to: magnetron current and voltage levels (for each magnetron), magnetron filament current and voltage levels, remote level, main control board temperature, system fault codes, digital input status, relay status, command, lamp head light intensity counts, lamp head pressure, lamp head temperature, and lamp head board temperature. Some operational data, referred to herein as static operational data, remains essentially unchanged (or changes slowly or in expected ways) during operation of the microwave excited ultraviolet lamp system. Because of these characteristics, static operational data does not need to be continuously monitored. Examples of static operational data include, but are not limited to: system configuration; cause of reset; number of power on/off cycles; cumulative power on times for the magnetron(s), filament, and power supply unit at start up; main board software version; phase board software version; lamp head interface processor software version, light detector board software version; I/O board software version; as well as any other component software and firmware versions.

The processor 50 receives operational data from the main control board 42 periodically, such as every 60 seconds. The data may be in the form of a data packet which contains about 1024 bytes, or one kilobyte, of data. Once the processor 50 has received the data packet, it is optional for the processor 50 to obtain a date and time from the clock 56 and add a date stamp to the data packet. The data packet is then stored in the memory cache 52 using a suitable file format, such as a text or binary file. Because static operational data does not typically change while the system 10 is running, static operational data may be stored less often than other types of operational data, such as once at the beginning of a system power on cycle. In cases where the static operational data is only stored at the beginning of a system power on cycle, the processor 50 may store this static operational data in a protected memory position within the memory cache 52, so that it will not be written over during the current power on cycle.

Memory cache 52 may be permanently attached to the data logger board 40, or memory cache 52 may be a physically removable memory such as a flash memory device in the form of a secure data (SD) card or the like. Memory cache 52 may include a single non volatile memory device or a plurality of non volatile memory devices, such as a non-volatile static random access memory (nvSRAM), ferroelectric random access memory (FeRAM), magnetoresistive random access memory (MRAM), or any other memory capable essentially unlimited read/write cycles and that retains stored digital information when power is lost. When the processor 50 has a data packet to store in the memory cache 52, the processor stores the data packet in an unused memory position if available. If the memory cache 52 is full, the processor stores the new data packet by writing over the oldest unprotected data packet currently stored in the memory cache 52. The processor thus stores operational data in the memory cache 52 using a first in/first out (FIFO) memory allocation system. By using non-volatile memory and storing operational data every second, the memory cache is operated so that in the event of a sudden power loss or other catastrophic system malfunction, at most one second worth of operational data will be lost. In one embodiment of the invention, memory cache includes about 1 megabyte of storage space, which may provide enough storage to hold about two hours of operational data, although the other amounts of memory may be used and the invention is not limited to a particular cache memory size.

Removable memory 54 includes at least one non volatile memory device, which may be a flash memory device in the form of a secure data (SD) card or the like. Similarly to the process described with respect to the cache memory 52, processor 50 is configured to copy the operational data stored in the cache memory 52 to the removable memory 54 periodically. For example, the operational data may be copied to the removable memory 54 whenever the contents of the cache memory 52 have been completely replaced by new data since the last time data was copied. Data is stored to the removable memory 54 using a FIFO memory allocation system so that once the removable memory 54 is full, the oldest data file stored in the removable memory 54 is deleted and replaced with the newest data file. The removable memory 54 may have more storage capacity than the cache memory 52 so that the removable memory 54 may maintain a long term operational history of the microwave excited ultraviolet lamp system 10. In one embodiment of the invention, the removable memory 54 has a storage capacity of about 4 gigabytes, which may provide enough storage to retain about one year of operational data.

Typically, most consumer flash memories can only withstand about 100,000 write cycles before the memory begins to deteriorate. However, this limitation may be ameliorated by properly sizing the cache memory 52. By way of a specific example, when a 4 gigabyte SD card is used for the removable memory 54, a 1 megabyte cache memory 52 will result in about 4000 write cycles between the memory cache 52 and removable memory 54 per year of operation. The expected life cycle for the removable memory 54 in this example would thus be over 24 years, which is essentially unlimited.

The user interface 59 is operatively coupled to the processor 50 in a known manner, and may include a keypad, one or more push buttons, a dial or other method for entering data so that the processor 50 will perform a desired function. The user interface may also include one or more displays or other indicators, such as a status light emitting diode (LED) to inform the user of the status of a data transfer.

The data port controller 62 is electrically coupled to the data ports 64, 66 and manages the transfer of data between the data logger board 40 and external devices 68, 70. In one embodiment of the invention, the data port controller 62 may implement a universal host controller interface (UHCI), which may include a universal serial bus (USB) host controller and host controller driver. The data port controller 62 schedules traffic on the data ports 64, 66 so that data may be transferred between the memory cache 52 and/or removable memory 54 and external devices 66, 68 interfaced with one of the data ports 64, 66. The data port controller function may be performed by a separate chipset, or alternatively, the data port controller function may be integrated into the processor 50.

In operation, a user desiring to retrieve operational data inserts an external device 68 into the data port 64. By way of example, the external device 68 may be a USB flash drive, and the data port 64 may be a USB type-A port. Upon sensing that a compatible external device has been connected to the data port 64, the data port controller 62 self enumerates to the device 68 and begins copying the contents of the memory cache 52 to the external device 68. The data port controller 62 provides an indication to the user that the data transfer process is in progress over the user interface 59, such as by causing a status LED to blink. When the data transfer is complete, the user is notified by another indication provided though the user interface 59, such as by causing the status LED to stop blinking and remain illuminated. The system user causes the data port controller 62 to release the external device 68 by, for example, pressing a push button on the user interface 59. When the device 68 is ready to be safely removed, the user interface 59 provides yet another indication to the user, such as by turning off the status LED. Alternatively, the data port controller 62 may automatically release the external device 68 once the data transfer is complete, in which case the user merely needs to wait for an indication on the user interface 59 that the transfer has been completed before removing the external device 68. The operational data may then be accessed from the external device 68 by a computer having a similar data port interface using any program capable of opening the file format. For example, in the case of a text file, the data may be viewed using Microsoft Notepad®, available from the Microsoft Corporation of Redmond Wash.

In some cases, it may be necessary to obtain operational data from a microwave excited ultraviolet lamp system 10 that has failed in such a way that the data logger board 40 is no longer powered. In this scenario, an external device 70 capable of sourcing power to the data logger board 40 may be connected to data port 66, which is configured so that the external device 70 may supply power to the data logger board 40. As a specific example, external device 70 may be a computer with a USB type-A port, such as a laptop computer, that is coupled to a USB type-B data port 68 using an USB type-A to type-B interface cable. Running on the power supplied by the external device 70, the power control circuit 60 will sense that internal power is unavailable and distribute the external power the localized functions necessary to transfer data from the either or both of the memory cache 52 and removable memory 54 to the external device 70. Typically, this will include providing power to the processor 50, memory cache 52, removable memory 54, and data port controller 62. The external device 70—or computer—may then be able to access the memory cache 52 through data port 66 either by using its own internal file system, or alternatively by running a proprietary application that retrieves the data and downloads it to the computer. Because the data logging board 40 is capable of being powered by an external device 70 such as a laptop computer, a technician may retrieve data from the data logger board 40 without relying on the availability of a power source at the work site. Thus, a technician working in an industrial environment that lacks a standard power source, such as a 120 volt alternating current source, will be able to retrieve data from the data logging board 40 by relying on power supplied by the external device 70.

Although operational data collected over a period of hours will typically be sufficient to allow troubleshooting and maintenance of the microwave excited ultraviolet lamp system 10, it may also be desirable to obtain operational data over a longer period of time, such as a year. For example, operational data obtained over a long period of time might be useful for developing a historical performance knowledge base useful for improving future microwave excited ultraviolet lamp system designs. Long term data may also be used to obtain objective data on how customers are actually using the system to develop new features, to detect abuse, and to validate warranty claims. Specific uses for long term historical data include, but are not limited to: monitoring data trends to determine component degradation rates and thereby predict component time to failure, improving maintenance schedules based on observed part longevity and failure modes, and determining weak points in the system based on a sample population of system failures to improve future designs. However, this type of long term data could be useful to competitors as well, so that it is desirable for the system manufacturer to maintain control over this type of long term data. To this end, the data logger board 40 may be configured so that only factory authorized personnel have access to the data stored in the removable memory 54.

The removable memory 54 may also be used to recover operational data from an ultraviolet lamp system 10 that has failed in such a way that the data logger board 40 is no longer functioning. In an alternative embodiment of the invention, the removable memory 54 may be the primary means of retrieving operational data from the data logger board 40. In this case, the data ports 64, 66 and data port controller 62 could be omitted from the data logger board 40.

To restrict access, the data may be encrypted before being stored, and/or the processor 50 might be configured to require an authentication code, password, and/or decryption key before allowing an external device to access the removable memory 54. The data logger board 40 may also use an encryption engine (not shown) implemented in either software or hardware to encrypt data stored to the removable memory 54 using known methods. To this end and by way of example only, data encryption may be performed by computer code running on the processor 50. A typical software implementation of the encryption engine might include the processor 50 reading an encryption key from a secure encryption key storage location. Based on logic programmed into the processor 50, the value of the encryption key, and other parameters, the processor 50 may periodically cause data bits to be inverted or toggled as they are stored to the removable memory 54. Upon retrieval of the encrypted data, the encryption key or a master encryption key would thereby be required to decrypt the data stored on the removable memory 54 in a known manner.

As used herein and in the claims, the terms "data" and "operational data" are to be considered interchangeable, and include any data representative of operational characteristics of the microwave excited ultraviolet lamp system, including the lamp head and power supply.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of applicants' general inventive concept.

What is claimed is:

1. A microwave excited ultraviolet lamp system, comprising:
 a lamp head including an ultraviolet lamp and a magnetron;
 a power supply configured to supply power to said lamp head; and
 a data logging and retrieval circuit operatively coupled to at least one of said lamp head and said power supply and including a first memory for storing data representative of operational characteristics of the system, and a first data port coupled to said first memory and operative to transfer the data from said first memory to an external device interfaced with said first data port.

2. The microwave excited ultraviolet lamp system of claim 1 wherein said first data port comprises a USB type-B port for receiving power from the external device so that the data is transferred from said first memory to the external device using power supplied from the external device.

3. The microwave excited ultraviolet lamp system of claim 1, wherein the data logging and retrieval circuit further comprises:
 a second memory for receiving and storing data representative of operational characteristics of said system from said first memory, at least one of said first and second memories being removable from said data logging and retrieval circuit.

4. The microwave excited ultraviolet lamp system of claim 3 further comprising a second data port coupled to at least one of said first and second memories for transferring the data stored on at least one of said first and second memories to the external device when the external device is interfaced to at least one of said first and second data ports.

5. The microwave excited ultraviolet lamp system of claim 4 wherein at least one of said first and second data ports is a USB type-B port and said data logging and retrieval circuit receives power from the external device via said USB type-B data port.

6. The microwave excited ultraviolet lamp system of claim 1 wherein said data logging and retrieval circuit further comprises a time keeping device operatively coupled to said first memory for providing a time stamp to the data representative of operational characteristics of the system.

7. The microwave excited ultraviolet lamp system of claim 1, wherein said data logging and retrieval circuit further comprises a second data port coupled to said first memory and at least one of said first and second data ports is a USB type-B data port.

8. The microwave excited ultraviolet lamp system of claim 1, said data logging and retrieval circuit further comprising:
 a processor coupled to said first memory for periodically receiving data representative of operational characteristics of the system, storing the data in said first memory, and transferring the data stored in said first memory to the external device when the external device is interfaced to said first data port.

9. The microwave excited ultraviolet lamp system of claim 8 wherein said data logging and retrieval circuit further comprises a second memory operatively coupled to said processor and said processor periodically transfers the data stored in said first memory to said second memory, and wherein at least one of said first and second memories is a removable memory.

10. The microwave excited ultraviolet lamp system of claim 9, wherein said data logging and retrieval circuit further comprises a second data port coupled to at least one of said first and second memories and said processor transfers the data stored in at least one of said first and second memories to the external device when the external device is interfaced to at least one of said first and second data ports.

11. The microwave excited ultraviolet lamp system of claim 10 wherein at least one of said first and second data ports is a USB type-B port and said data logging and retrieval circuit receives power from the external device via said USB type-B data port.

12. The microwave excited ultraviolet lamp system of claim 1 wherein said data logging and retrieval circuit is integrated with said power supply.

13. A microwave excited ultraviolet lamp system, comprising:
 a lamp head including an ultraviolet lamp and a magnetron;
 a power supply configured to supply power to said lamp head; and
 a data logging and retrieval circuit operatively coupled to at least one of said lamp head and said power supply and including a removable memory for storing data representative of operational characteristics of the system.

14. A method of storing and retrieving data representative of operational characteristics of a microwave excited ultraviolet lamp system having a data logging and retrieval circuit including a first memory comprising:
 storing data representative of operational characteristics of the microwave excited ultraviolet lamp system in the first memory of the data logging and retrieval circuit; and
 transferring the data stored in the first memory to an external device.

15. The method of claim 14 wherein the first memory is a removable memory and transferring the data stored in the first memory to the external device includes:
 removing the first memory from the data logging and retrieval circuit;
 interfacing the first memory with the external device; and
 reading the data with the external device.

16. The method of claim 14 wherein the data logging and retrieval circuit includes a first data port coupled to the first memory and transferring the data stored in the first memory to the external device includes:
 coupling the external device to the first data port of the data logging and retrieval circuit; and
 transferring the data from the first memory to the external device via the first data port.

17. The method of claim 16 further comprising:
 receiving power from the external device via the first data port; and
 powering the data logging and retrieval circuit with the power received from the external device.

18. The method of claim 16 wherein the data stored in the first memory is transferred to the external device in response to sensing that the external device has been coupled to the data port.

19. The method of claim 14 further comprising:
 time stamping the data representative of operational characteristics of the microwave excited ultraviolet lamp system stored in the first memory.

20. The method of claim 14 wherein the data logging and retrieval circuit includes a second memory and further comprising:
 reading the data stored in the first memory of the data logging and retrieval circuit; and
 storing the data in the second memory of the data logging and retrieval circuit.

21. The method of claim 20 wherein at least one of the first and second memories is a removable memory and further comprising:
- removing at least one of the first and second memories from the data logging and retrieval circuit;
- interfacing the at least one of the first and second memories with an external device; and
- reading the data with the external device.

22. The method of claim 20 wherein the data logging and retrieval circuit includes a second data port coupled to at least one of the first and second memories and further comprising:
- transferring the data stored in at least one of the first and second memories to the external device via at least one of the first and second data ports.

* * * * *